Figure 1:
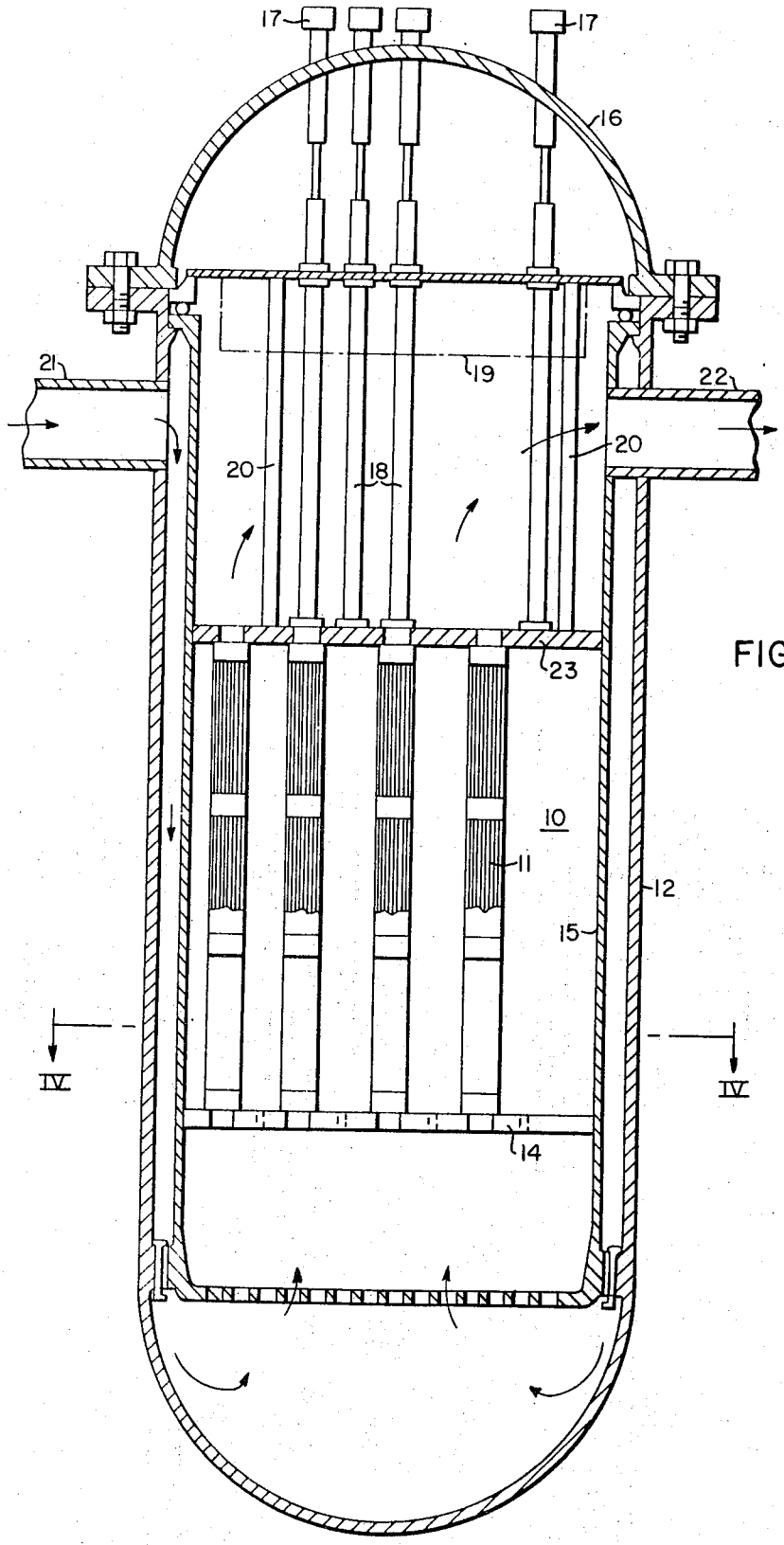
Figure 2:
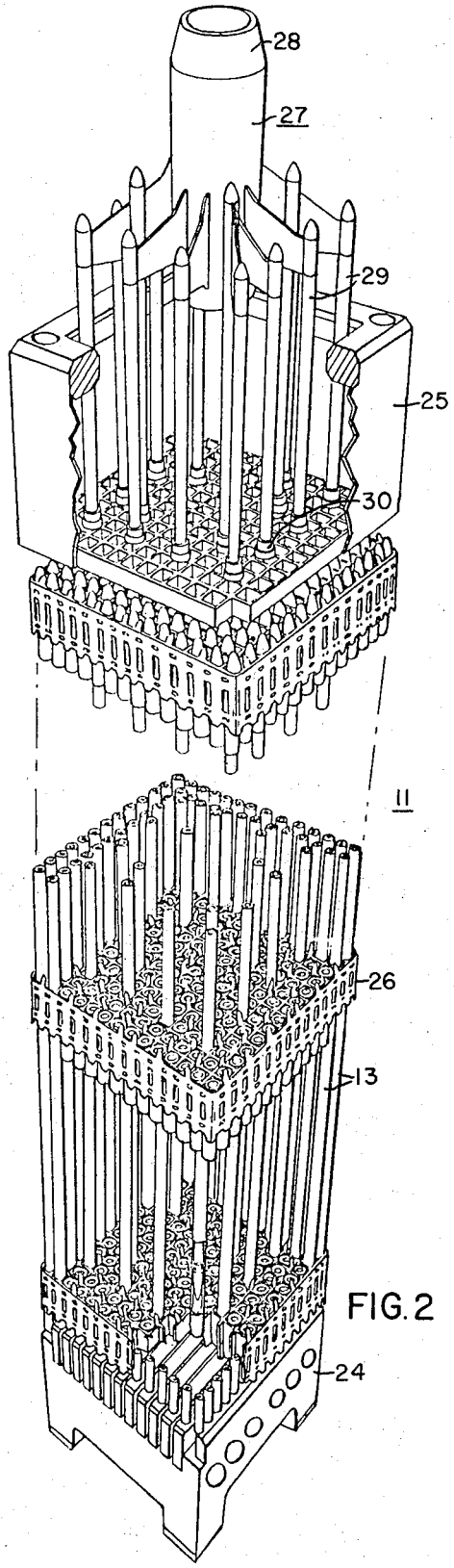
Figure 3:
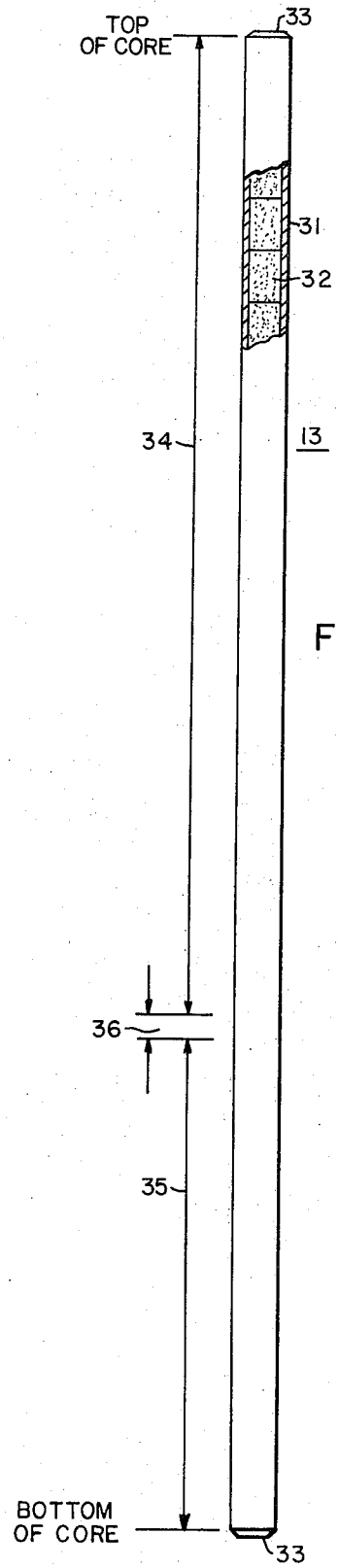
Figure 4:
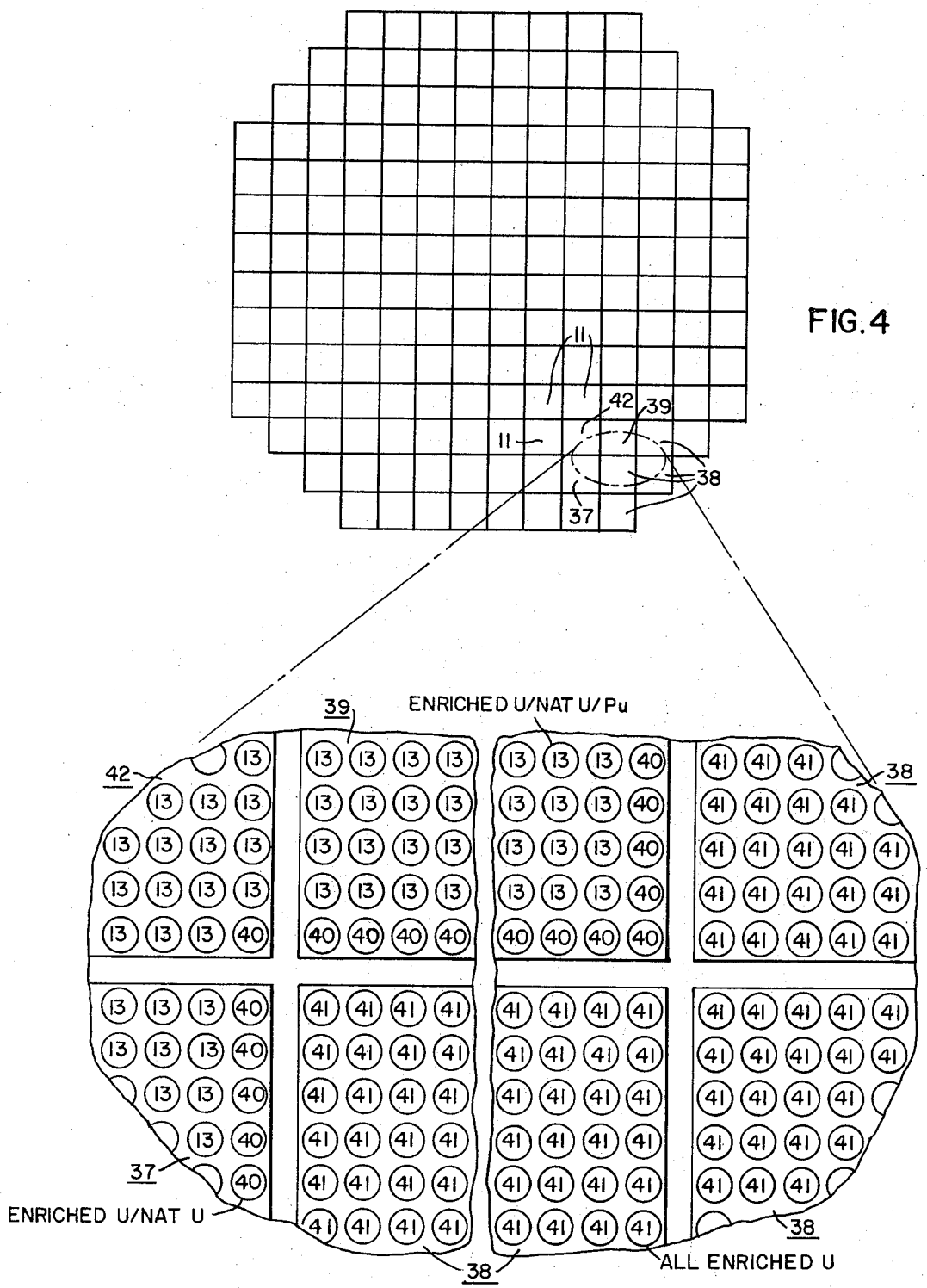

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 16, 1974

921 O.G. 868

T921,019
CORE FOR A NUCLEAR REACTOR
Robert F. Barry, 2524 Haymaker Road, Monroeville, Pa. 15146
Filed Jan. 5, 1973, Ser. No. 321,410
**Int. Cl. G21c *3/28***
U.S. Cl. 176—18
3 Sheets Drawing — 11 Pages Specifications

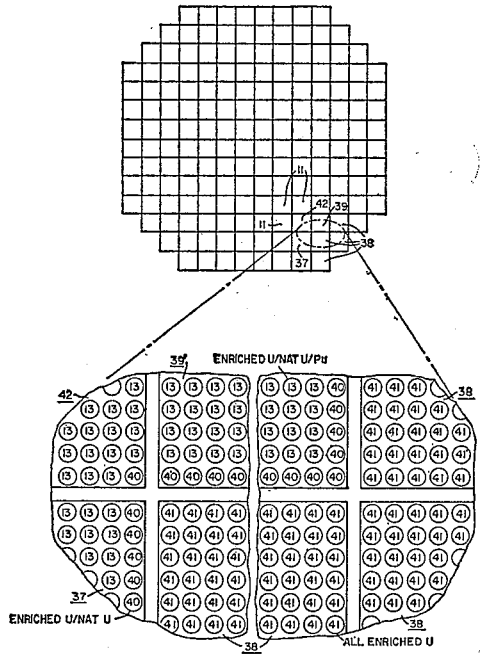

A reactor core having tandem arranged fuel regions for use in a water moderated nuclear reactor. An upper core region is fueled with enriched uranium oxide; while, a lower core region is fueled with a plutonium oxide. An intermediate core region contains natural uranium oxide.

CORE FOR A NUCLEAR REACTOR

Filed Jan. 5, 1973 3 Sheets-Sheet 1

CORE FOR A NUCLEAR REACTOR

Filed Jan. 5, 1973 3 Sheets-Sheet 2

CORE FOR A NUCLEAR REACTOR

Filed Jan. 5, 1973 3 Sheets-Sheet 3